United States Patent
Hayashi

(10) Patent No.: US 6,636,738 B1
(45) Date of Patent: Oct. 21, 2003

(54) RADIO-NETWORK CONTROL APPARATUS AND RADIO-NETWORK CONTROL METHOD

(75) Inventor: Morihiko Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 450 days.

(21) Appl. No.: 09/610,626

(22) Filed: Jul. 5, 2000

(30) Foreign Application Priority Data

Jul. 7, 1999 (JP) ............................................ 11-193251
Jun. 8, 2000 (JP) ........................................ 2000-171697

(51) Int. Cl.[7] .................................................. H04Q 7/20
(52) U.S. Cl. ................... 455/450; 455/41.2; 455/67.11; 370/338; 370/445
(58) Field of Search .......................... 455/41, 446, 447, 455/448, 450, 451, 452, 67.1, 67.4, 67.5, 41.2; 370/338, 445, 447, 450, 453

(56) References Cited

U.S. PATENT DOCUMENTS 5,745,483 A * 4/1998 Nakagawa et al. ......... 370/335
6,192,230 B1 * 2/2001 Bokhorst et al. ........... 455/343

FOREIGN PATENT DOCUMENTS

| EP | 0782297 | 7/1997 | ............ H04L/12/28 |
| WO | 9524081 | 9/1995 | ............ H04B/1/713 |
| WO | 9809466 | 3/1998 | ............ H04Q/7/36 |
| WO | 9835453 | 8/1998 | ............ H04B/7/00 |
| WO | 9914897 | 3/1999 | ............ H04L/12/28 |

OTHER PUBLICATIONS

J. Haartsen, "Bluetooth—The universal radio interface for ad hoc, wireless connectivity," Ericsson Review No. 3, 1998, pp. 110–117, XP000783249.

* cited by examiner

Primary Examiner—Lee Nguyen
(74) Attorney, Agent, or Firm—Jay H. Maioli

(57) ABSTRACT

A radio-network control method selects a channel having a short transmission-waiting time in a radio network which can use a plurality of radio communication channels. Before selecting the channel, the method detects a channel which another radio network is using and a channel having high noise.

10 Claims, 9 Drawing Sheets

| CHANNEL | NETWORK | FIELD INTENSITY |
|---|---|---|
| 1 | 1 | HIGH AND CONTINUITY |
| 2 | 2 | LOW AND DISPERSION |
| 3 | VACANCY | HIGH AND CONTINUITY |

RADIO-NETWORK CONTROL APPARATUS AND RADIO-NETWORK CONTROL METHOD

BACKGROUND OF THE INVENTION

1. Field of the Invention

The present invention relates to radio-network control apparatuses and radio-network control methods, and more particularly, to a radio-network control apparatus and a radio-network control method which select a radio communication channel used for a radio network, according to an environment measurement in which the period of time during which a communication channel cannot be used because the carrier transmitted from another apparatus reaches a predetermined strength is measured.

2. Description of the Related Art

Communication methods used for constructing a radio local area network (LAN) system include the Carrier Sense Multiple Access/Collision Avoidance (CSMA/CA) method. Communication methods used for constructing a wire LAN system include the Carrier Sense Multiple Access/Collision Detection (CSMA/CD) method.

In a radio LAN employing the CSMA/CA method, a communication channel used for actual communication is selected among a plurality of communication channels which can be used for communication, and the selected communication channel is shared by a plurality of communication terminals constituting the LAN. The communication channel is selected according to the instruction of the LAN user or when it has the minimum receiving electric-field strength, which is called the minimum signal receiving strength, among the plurality of communication channels which can be used for communication. The communication channel having the minimum receiving electric-field strength is selected because it has a low possibility of signal contention with other LANs.

Each of the plurality of communication terminals constituting the LAN transmits data as a packet by using the carrier having the frequency of the selected communication channel. Each communication terminal detects the carrier before transmitting a packet to check whether the communication channel is clear. When the communication channel is clear, the terminal transmits a packet.

In this way, with the use of the CSMA/CA method, even if a plurality of communication terminals share one communication channel, data is positively transmitted and received in a network without generating collisions in the communication channel. The CSMA/CA method is suited to LANs having a transfer rate of about 1 Mb/sec to 10 Mb/sec.

As described above, in a radio LAN system employing the CSMA/CA method, a communication channel is selected according to the instruction of the user or when it has the minimum carrier receiving strength.

When a communication channel is selected according to the instruction of the user, however, if the communication channel specified by the user is being used by another radio LAN system, the period of time during which the communication channel is clear is short since communication performed by two different LAN systems may cause contention in one communication channel.

In such a case, even when each communication terminal in each radio LAN system checks whether the communication channel is clear by carrier detection before it transmits a packet, the communication channel is being used in many cases, and it takes a long time to start transmitting a packet.

When the communication channel having the minimum carrier receiving strength is selected, if noise transmitted from an electric unit such as a microwave oven frequently jumps in at such a level that a packet transmission is impeded, a packet cannot be transmitted promptly.

In other words, when a communication terminal of a radio LAN system detects the carrier before transmitting a packet to check whether the communication channel is clear, it is deemed that the communication channel is being used due to the noise. In such a case, a packet cannot be transmitted until the noise is eliminated.

As described above, when a communication channel is selected either according to the instruction of the user or when it has the minimum carrier receiving strength, a packet cannot promptly be transmitted in some cases. In such cases, the data transfer capacity of the radio LAN system is reduced for a predetermined period of time and data cannot promptly be transmitted or received.

SUMMARY OF THE INVENTION

Accordingly, it is an object of the present invention to provide a selection method and a communication apparatus which select a radio communication channel used for a radio network, according to an environment measurement in which the period of time during which a communication channel cannot be used because the carrier transmitted from another apparatus reaches a predetermined strength is measured.

The foregoing object is achieved in one aspect of the present invention through the provision of a radio-communication-channel selection method used in a radio communication system in which a plurality of radio networks share a plurality of radio communication channels, for selecting a predetermined radio communication channel among the plurality of radio communication channels and for setting it to the radio communication channel of a new radio network, the radio channel method includes a determination step of determining whether the ID of the new radio network to be structured is received; a measurement step of detecting radio-signal intensity for a predetermined time for each of the plurality for radio communication channels and of measuring the time when each radio communication channel is clear according to the detected signal intensity and a predetermined value for each of the plurality of radio communication channels when it is determined in the determination step that the ID of the hew radio network to be structured is not received; and a selection step for selecting the radio communication channel to be used for the new radio network to be structured, according to the time when each communication channel is clear, measured for each of the plurality of radio communication channels.

The foregoing object is achieved in another aspect of the present invention through the provision of a radio network apparatus used in a radio communication system in which a plurality of radio networks share a plurality of radio communication channels, for selecting a predetermined radio communication channel among the plurality of radio communication channels and for setting it to the radio communication channel of a new radio network the radio network apparatus includes antenna means; tuner means for tuning in to each of the plurality of radio communication channels input from the antenna means, for outputting a measurement signal for measuring radio-signal intensity, for extracting a packet signal from a received signal, and for outputting the packet signal; signal-intensity-measurement means for measuring the signal intensity of the measurement signal for each of the plurality of radio communication channels, output from the tuner means, and for measuring the clear time of each of the plurality of radio communication channels according to the result of the signal-intensity measurement; and channel selection means for controlling the tuner means so as to tune in to each of the plurality of radio communication channels and to output the measurement signal and the packet signal, for controlling the signal-intensity measurement means so as to measure the clear time of each of the plurality of radio communication channels according to the measurement signal output from the tuner means, the channel selection means also selects a radio communication channel to be used for the radio network according to the clear time of each of the plurality of radio communication channels, output from the signal-intensity measurement means.

The foregoing object is achieved in still another aspect of the present invention through the provision of a method for joining a predetermined network in a radio communication area where a plurality of adjacent radio networks which share a plurality of radio communication channel, the method includes including a detection step of detecting a radio network having a predetermined ID in the plurality of radio communication channels; and, when a radio network having the predetermined ID is detected in the detection step, a step of executing communication according to a beacon signal transmitted at a predetermined-time interval by a control station which controls the predetermined radio network.

DESCRIPTION OF THE PREFERRED EMBODIMENTS

Figure 1:
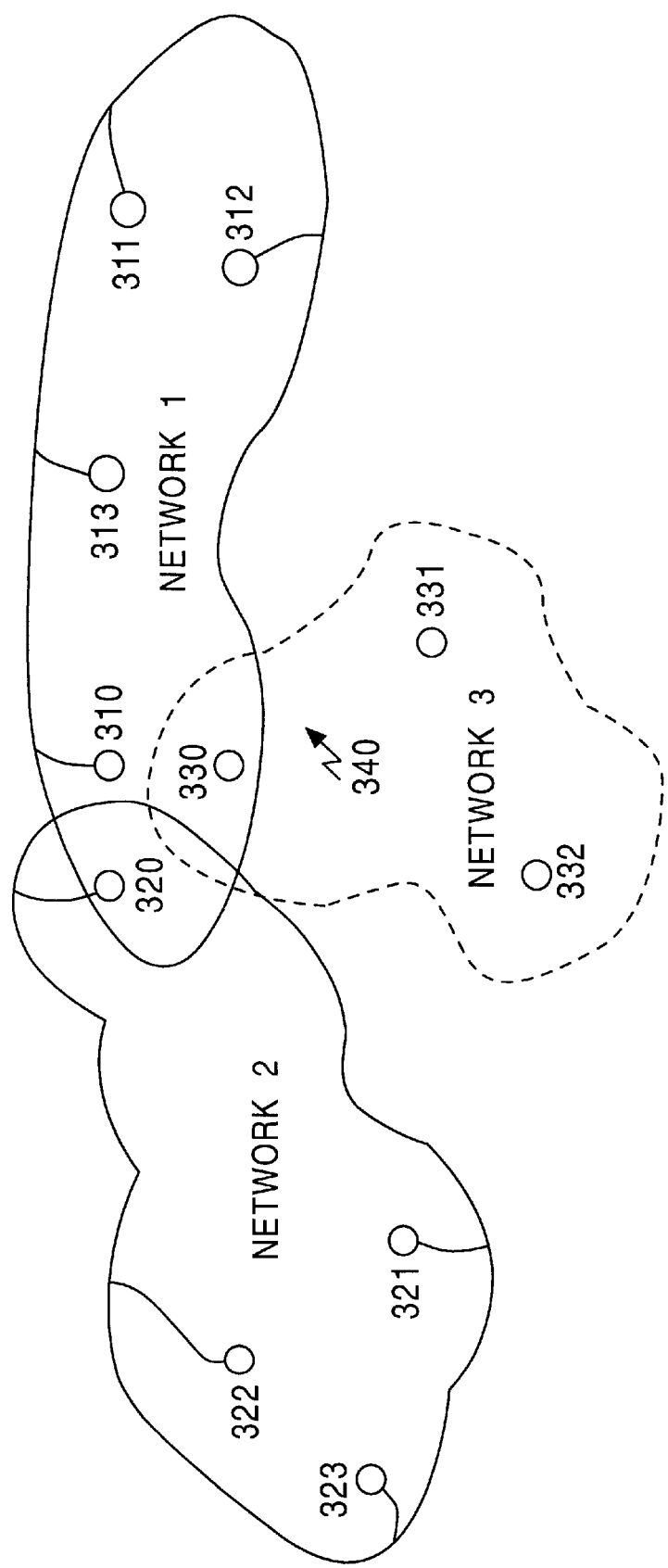
FIG. 1 is a view of an environment where a radio network to which the present invention is applied is used.

A communication channel selection method, a communication method, and a communication apparatus according to embodiments of the present invention will be described below by referring to the drawings. The following embodiments show a case in which a LAN system is constructed by connecting a plurality of communication apparatuses by radio.

Network Structure

FIG. 1 shows a condition in which a plurality of adjacent radio networks use radio frequencies close to each other.

In FIG. 1, a radio network 1 is formed of LAN terminal apparatuses 310, 311, 312, and 313, and a radio network 2 is formed of LAN terminal apparatuses 320, 321, and 322. There are also closely disposed in FIG. 1 a LAN terminal apparatus 323 which subscribes to the network 2 when it is ready to communicate, LAN terminal apparatuses 330, 331, and 332 which form a radio network 3 when they are ready to communicate, and an apparatus 340 which is not a LAN terminal apparatus of a radio network but emits an electric wave having a radio frequency close to those of the electric waves used by the three radio networks 1, 2, and 3.

Within the boundary of each network, the electric wave emitted from a LAN terminal apparatus constituting the network maintains a predetermined intensity to allow the other LAN terminal apparatuses belonging to the same network to communicate with the terminal apparatus which emits the wave. The line connecting the boundary to each LAN terminal apparatus indicates a condition in which the LAN terminal apparatus is connected to the radio network. It is understood, for example, that the LAN terminal apparatus 323 is now operating and is connected to the network 2 since the terminal apparatus is connected to the boundary by a line. In addition, since the LAN terminal apparatus 323 is disposed inside the boundary of the network 2, it can be connected to the network 2 if subscription processing is executed.

Figures 2, 3:
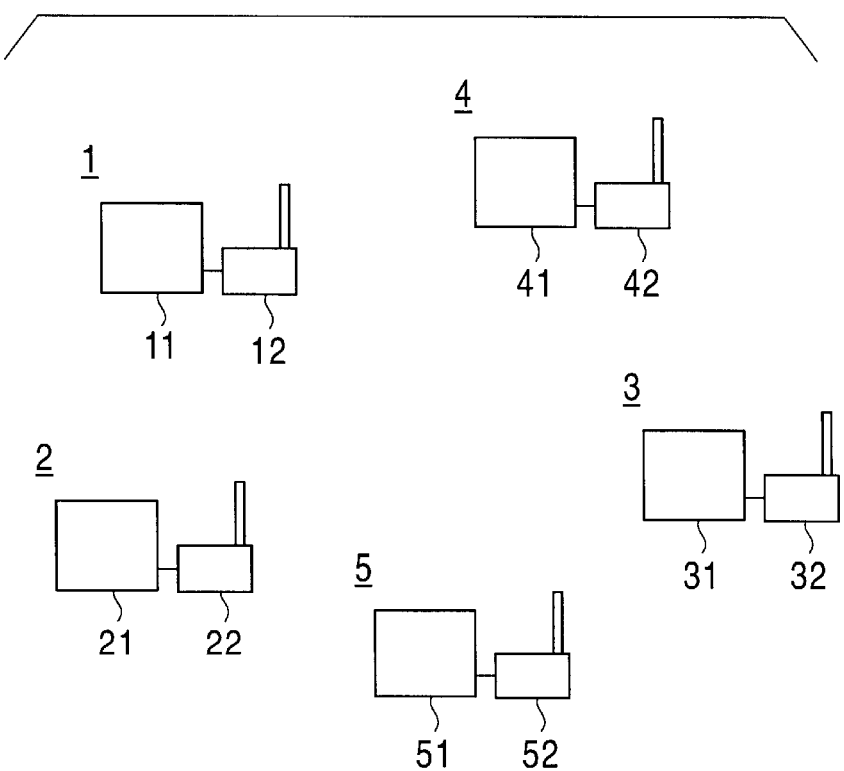
FIG. 2 is a view showing a channel-use condition of a radio network which a communication system according to the present invention is to use.
FIG. 3 is a view of a communication system according to an embodiment of the present invention.

FIG. 2 shows the relationships between the plurality of radio networks shown in FIG. 1 and used communication channels in a condition in which a plurality of radio networks can be formed with predetermined frequency bands. As shown in FIG. 2, three radio-network communication channels 1, 2, and 3 can be currently used. The network 1 uses the channel 1, the network 2 uses the channel 2, and the channel 3 is clear.

FIG. 3 is a view showing the structure of the LAN according to the present embodiment. The LAN in the present embodiment has a so-called peer-to-peer LAN structure, in which each LAN terminal apparatus connected to the LAN has the same level.

The LAN shown in FIG. 3 shows, for example, the structure of the network 1 shown in FIG. 1.

In FIG. 3, terminal apparatuses 11, 21, 31, 41, and 51 are personal computers and workstations. Radio communication units, so-called LAN units, 12, 22, 32, 42, and 52 serving as communication terminals in the present embodiment are connected to the terminal apparatuses 11, 21, 31, 41, and 51 to form LAN terminal apparatuses 1, 2, 3, 4, and 5, respectively, and the LAN terminal apparatuses can communicate with each other.

In the present embodiment, the LAN terminal apparatuses 1, 2, 3, 4, and 5 can also serve as control stations. When no LAN terminal apparatus is connected to a LAN, for example, a LAN terminal apparatus which is turned on first and is connected to the LAN also serves as a control station.

In the present embodiment, a LAN terminal apparatus serving as a control station selects a communication channel for which communication traffic contention is unlikely to occur, among a plurality of communication channels using different frequencies, and periodically transmits a beacon signal as a control signal in a communication area through the selected communication channel to open the communication area, as described later.

The beacon signal is used to report reference timing for packet transmission in random communication or in real-time communication to each LAN terminal apparatus. In addition, during real-time communication, the beacon signal reports the order of transmitted packets, which is to be specified by the control station, to each LAN terminal apparatus. The beacon signal serves as a control signal in the communication area which the control station opens.

The beacon signal is a packet which includes the identification ID for identifying a LAN in the present embodiment. Therefore, each LAN terminal apparatus detects the beacon signal, which is periodically transferred through the communication channel selected by the control station, to detect the communication area which the control station of the LAN which the terminal apparatus belongs to opens, subscribes to the communication area, and executes real-time communication or random communication.

In the LAN according to the present embodiment, the CSMA/CA communication method is used. In the method, each of the LAN terminal apparatuses 1, 2, 3, 4, and 5 receives data by packet commination. Each apparatus detects the carrier before transmitting a packet to avoid packet collision in the communication channel selected by the control station.

More specifically, each of the LAN terminal apparatuses 1, 2, 3, 4, and 5 connected to the LAN in the present embodiment detects the carrier having the frequency of the communication channel selected by the control station before transmitting a packet. From this carrier detection, each LAN terminal apparatus determines whether the communication path is being used or clear. When the communication path is clear, the apparatus executes packet transmission, and thus packet-transmission collision with the other LAN terminal apparatuses is avoided.

Figure 4:
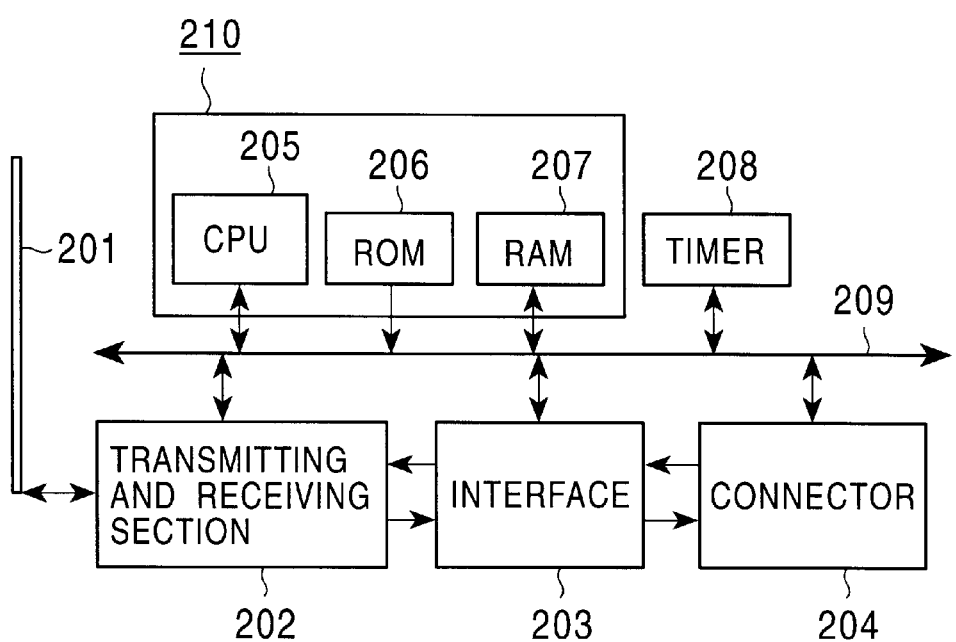
FIG. 4 is a block diagram of a radio communication unit serving as the LAN unit of each LAN terminal apparatus shown in FIG. 3.

FIG. 4 is a block diagram of each of the LAN units 12, 22, 32, 42, and 52 serving as communication apparatuses in the present embodiment. The LAN units 12, 22, 32, 42, and 52 have the same structure in the present embodiment.

As shown in FIG. 4, each of the LAN units 12, 22, 32, 42, and 52 is formed of an antenna 201, a transmitting and receiving section 202, an interface section 203, a connector 204, a CPU 205, a ROM 206, a RAM 207, a timer 208, and a bus 209.

The CPU 205, the ROM 206, and the RAM 207 form a control section 210 of the LAN unit. The ROM 206 stores a program and data required for processing. The RAM 207 is used as a work area for various types of processing.

As shown in FIG. 4, the control section 210 is connected to the transmitting and receiving section 202 and the interface section 203 through the bus 209. The control section 210 controls these sections. The connector 204 is used to connect the LAN unit to the corresponding terminal apparatus.

The transmitting and receiving section 202 is provided with a phase locked loop (PLL) for communication-channel selection. The transmitting and receiving section 202 selects the communication channel having the desired frequency among a plurality of communication channels having different frequencies to transmit and receive data through the selected communication channel, under the control of the control section 210. The transmitting and receiving section 202 also executes transmission-data modulation processing and receiving-data demodulation processing.

As described above, the transmitting and receiving section 202 detects the carrier before packet transmission, for example, in cooperation with the control section 210. When the communication channel to be used is clear, the transmitting and receiving section 202 controls packet transmission timing.

The interface section 203 enables data communication between the corresponding terminal apparatus and the LAN. In the present embodiment, the interface section 203 has a function for generating a transmission packet and for separating a received packet.

The LAN unit is provided with the timer 208. The timer 208 is used to measure the length of the clear period of time of each communication channel when a communication channel to be used for communication is selected among a plurality of communication channels having different frequencies. To this end, the timer 208 is, for example, provided with count areas for selectable communication channels having different frequencies, and serves as a clear-time measuring timer for measuring the clear time of each communication channel.

Selection of Operation State

Each of the LAN terminal apparatuses 1, 2, 3, 4, and 5 determines whether the communication area of the LAN which the LAN terminal apparatus belongs to is opened, for example, when the corresponding terminal apparatus and the LAN unit are turned on, to determine whether the LAN terminal apparatus operates as a control station or operates as a slave station of the control station which has already operated.

Figure 5:
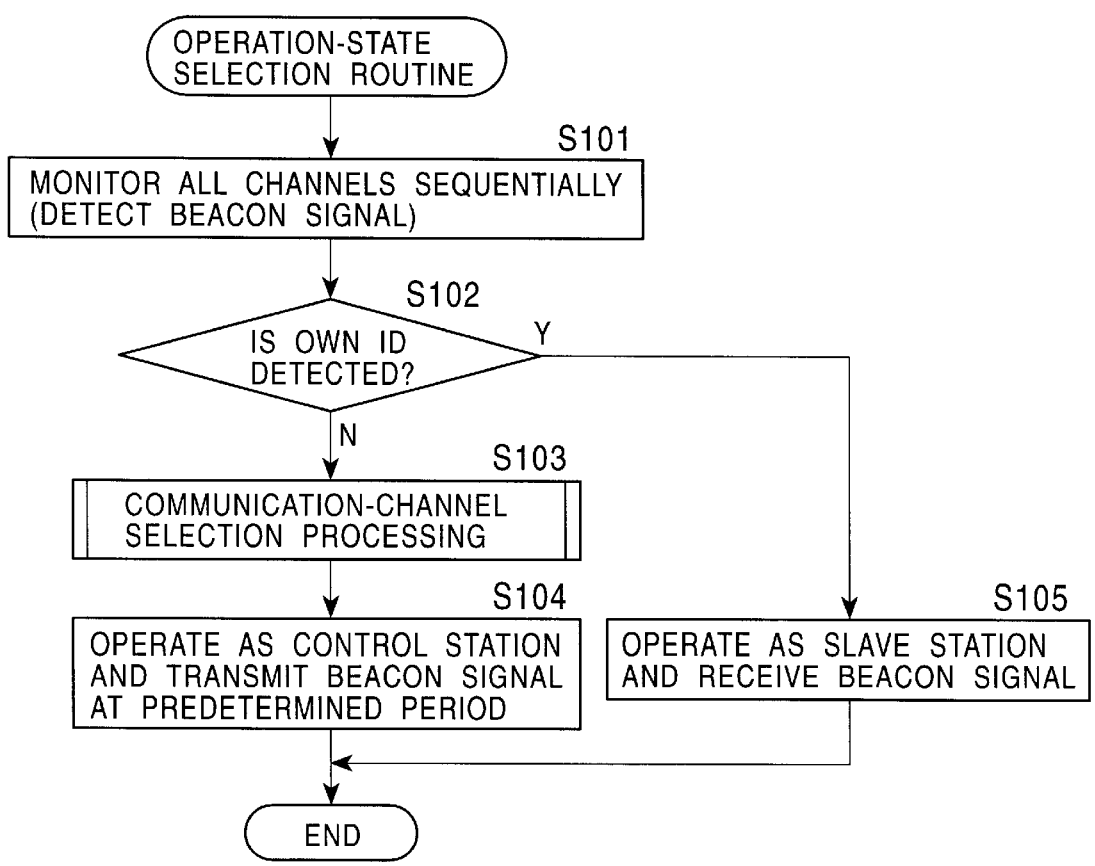
FIG. 5 is a flowchart of operation-state selection processing.

FIG. 5 is a flowchart of operation-state selection processing for determining whether a LAN terminal apparatus operates as a control station or as a slave station in the LAN which the LAN terminal apparatus belongs to, the processing being executed when each of the LAN terminal apparatuses 1 to 5 is connected to the LAN through the corresponding LAN unit 12, 22, 32, 42, or 52.

When each of the LAN units 12 to 52 is turned on, its control section 210 controls the receiving frequency of the PLL circuit of the transmitting and receiving section 202 to monitor each of a plurality of selectable communication channels having different frequencies and to detect the beacon signal having the identification ID of the LAN which the corresponding LAN terminal apparatus belongs to, in a step S101.

In the process of the step S101, each communication channel is monitored for a predetermined period sufficient for detecting the beacon signal periodically transmitted, for example, for a plurality of transmission periods of the beacon signal to detect the beacon signal having the identification ID of the LAN which the LAN terminal apparatus belongs to.

Then, in a step S102, the LAN unit determines whether the beacon signal having the identification ID of the LAN which the corresponding LAN terminal apparatus belongs to has been detected. When it is determined in the step S102 that the beacon signal of the LAN which the LAN terminal apparatus belongs to cannot be detected, the LAN terminal apparatus operates as a control station. In other words, communication-channel selection processing for selecting a communication channel having a long clear time among a plurality of selectable communication channel is executed in a step S103.

Then, the control section 210 of the LAN unit controls the interface section 203 to generate a beacon signal which includes the identification ID of the LAN which the corresponding LAN terminal apparatus belongs to, and transmits it to the communication channel selected in the step S103 through the transmitting and receiving section 202 to periodically transmit to LAN terminal apparatuses which belong to the same LAN, in a step S104. With this manipulation, a communication area in which a plurality of LAN terminal apparatuses which belong to the same LAN perform communication is opened.

When it is determined in the step S102 that the beacon signal of the LAN which the LAN terminal apparatus belongs to has been detected, the LAN unit operates as a slave station of the control station which has already operated, in a step S105. More specifically, the LAN terminal apparatus subscribes to the communication area of the LAN which the LAN terminal apparatus belongs to, receives the beacon signal from the control station, and executes real-time communication or random communication according to the timing and information which the beacon signal provides.

As described above, in the present embodiment, each of the LAN terminal apparatuses operates as a control station when the communication area of the LAN which the LAN terminal apparatus belongs to has not yet been opened, opens a communication area, and executes communication among the LAN terminal apparatuses which belong to the same LAN.

Each of the LAN terminal apparatuses operates as a slave station of the control station which has already operated when the communication area of the LAN which the LAN terminal apparatus belongs to has already opened, subscribes to the communication area which the control station has opened, and executes communication among the LAN terminal apparatuses which belong to the same communication area.

Real-time Communication and Random Communication

Figure 6:
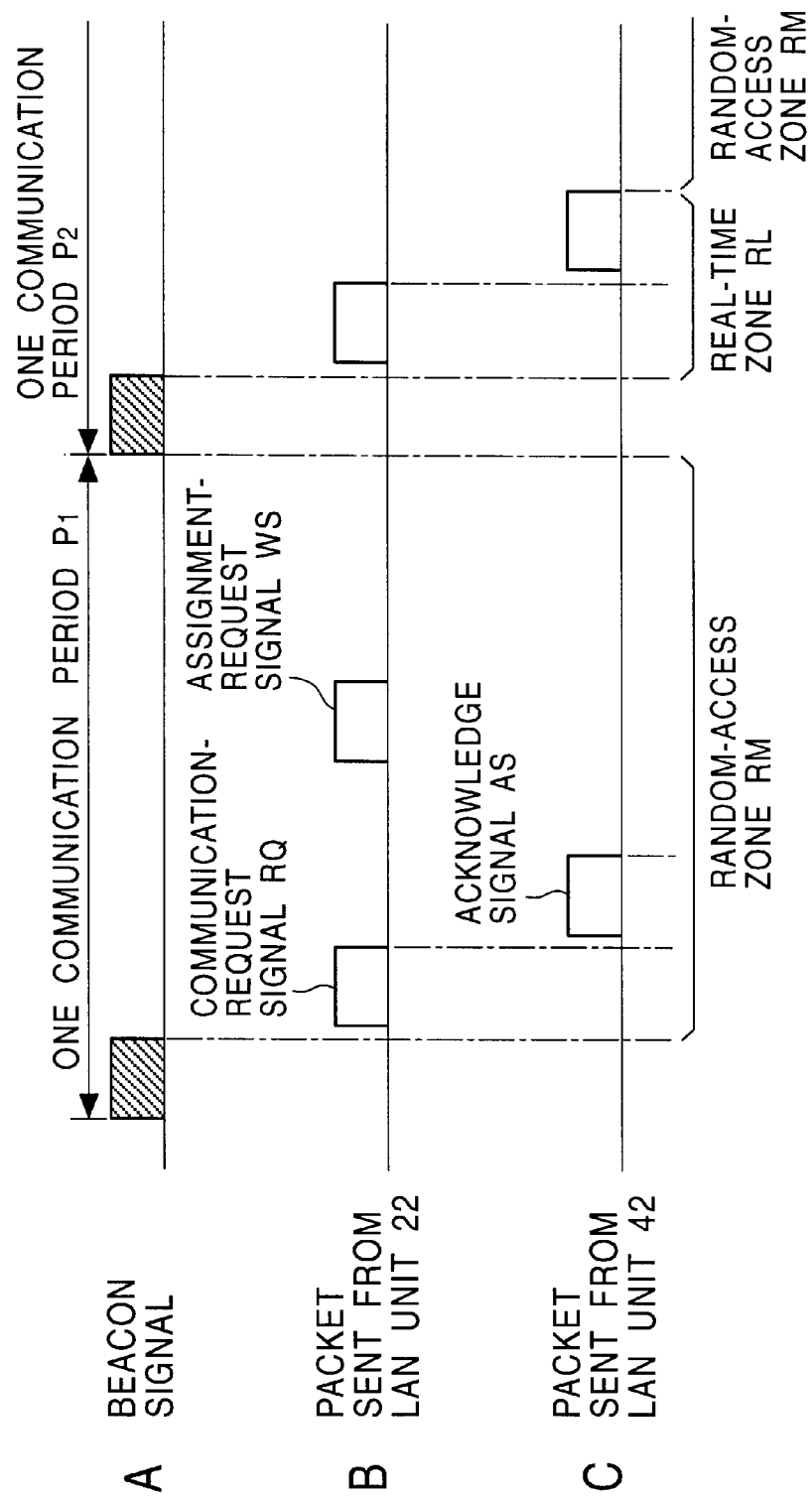
FIG. 6 is a view showing a communication area which a control station opens; and a beacon signal, a packet transmitted from a LAN unit 22, and a packet transmitted from a LAN unit 42 used in communication between LAN terminal apparatuses in the communication area.

Real-time communication and random communication to be executed in a communication area opened when the control station transmits a beacon signal will be described below by referring to FIG. 6. FIG. 6 is a view showing a real-time zone for real-time communication and a random-access zone for random communication in the communication area of the LAN according to the present embodiment.

In the present embodiment, as shown in A of FIG. 6, one period of the beacon signal transmitted from the control station is set to one communication period and communication is executed with one communication period being used as a communication-processing reference period in the LAN. As described later, the control station assigns packet-transmission timing within each communication period to a LAN terminal apparatus which executes real-time communication.

In the following description, real-time communication and random communication will be described below for a case, for example, in which the LAN terminal apparatus 1 serves as a control station and opens a communication area, and bi-directional real-time communication is executed between the LAN terminal apparatus 2 and the LAN terminal apparatus 4 in the LAN shown in FIG. 3. To make the description simple, in the communication area which the LAN terminal apparatus 1 serving as the control station opens, it is assumed that, while no communication is executed among the LAN terminal apparatuses, the LAN terminal apparatus 2 calls the LAN terminal apparatus 4 to execute bi-directional communication.

In the LAN according to the present embodiment, a zone where transmission timing is specified and real-time communication is executed according to the transmission timing is called a real-time zone RL, and a zone where transmission timing is not specified and random communication is performed is called a random-access zone RM.

When the control station has not specified transmission timing for real-time communication, the whole of each communication period is used as a random-access zone RM as shown in a first communication period P1 in A, B, and C of FIG. 6. When the user of the LAN terminal apparatus 2 issues an instruction for executing bi-directional communication with the LAN terminal apparatus 4, to the terminal apparatus 21, the terminal apparatus 21 transmits the own identification ID, the destination identification ID, and information indicating a request for bi-directional communication to the LAN unit 22.

The information transmitted from the terminal apparatus 21 is transmitted to the interface section 203 of the LAN unit 22 through the connector 204 of the LAN unit 22. The interface section 203 of the LAN unit 22 generates a packet RQ serving as a communication request signal to the LAN terminal apparatus 4, which includes the own identification ID and the destination identification ID, in this case, the identification ID of the LAN terminal apparatus 4, and information indicating a bi-directional communication request, and transmits it to the transmitting and receiving section 202.

The transmitting and receiving section 202 amplifies the transmitted packet and performs other processing to generate a transmission signal, and transmits it to the LAN terminal apparatus 4 through the antenna 201.

In this case, the communication request of the LAN unit 22 is transmitted to the LAN terminal apparatus 4 in a random-access zone RM, as shown by the P1 period in B of FIG. 6.

As also described before, in the LAN unit according to the present embodiment, the transmitting and receiving section 201 and the control section 210, for example, detects the carrier to avoid packet-transmission collision, checks in advance that the carrier signal is not received, and transmits a packet when the transmission path is clear.

If the transmission path is not clear, the LAN unit is idle until the transmission path becomes clear. During packet transmission by random access, it may be required to wait randomly.

In the LAN terminal apparatus 4, the transmitting and receiving section 202 receives radio-transmitted packets through the antenna 201 of the LAN unit 42. The transmitting and receiving section 202 accepts only the packet transmitted thereto according to the transmission destination IDs of the received packets, and transmits the accepted packet to the interface section 203. The interface section 203 separates the packet transmitted from the transmitting and receiving section 202, extracts the data transmitted from the LAN terminal apparatus 2, and transmits it to the terminal apparatus 41 through the connector 204.

Then, the terminal apparatus 41 reports the communication request of the LAN terminal apparatus 2 to the user of the LAN terminal apparatus 4 according to the communication request transmitted thereto, for example, by ringing a bell or by displaying a message on a display unit provided for or connected to the terminal apparatus 41.

When the user of the LAN terminal apparatus 4 executes an operation to respond to the communication request transmitted from the LAN terminal apparatus 2 on the terminal apparatus 41, the terminal apparatus 41 transmits the own identification ID and the destination identification ID, in this case, the identification of the LAN terminal apparatus 2 and information indicating that the communication request is responded, to the LAN unit 42.

The information transmitted from the terminal apparatus 41 is transmitted to the interface section 203 through the connector 204 of the LAN unit 42 in the same way as for the LAN terminal apparatus 2. The interface section 203 generates a packet AS serving as an acknowledge signal indicating that the communication request is accepted. This acknowledge signal AS is transmitted to the LAN terminal apparatus 2 through the transmitting and receiving section 202 and the antenna 201 of the LAN unit 42. The acknowledge signal AS is transmitted within the random-access zone RM as shown in C of FIG. 6.

When the LAN unit 22 of the LAN terminal apparatus 2 receives the acknowledge signal AS transmitted from the LAN unit 42 of the LAN terminal apparatus 4, the interface section 203 of the LAN unit 22 generates a packet WS serving as an assignment-request signal for assigning transmission timing to both of the LAN terminal apparatus 2, including the LAN unit 22, and the LAN terminal apparatus 4, and transmits it to the LAN terminal apparatus 1, serving as the control station, through the transmitting and receiving section 202 and the antenna 201.

This assignment-request signal WS is formed of the identification ID of the request source, the LAN terminal apparatus 2, the identification ID of the request destination, the LAN terminal apparatus 4, and information indicating that a transmission-timing assignment is requested. The assignment-request signal WS is also transmitted within the random-access zone RM as shown in B of FIG. 6.

The LAN terminal apparatus 1 assigns the transmission timing determined by the packet-transmission order in each communication period to the LAN terminal apparatus 2 and to the LAN terminal apparatus 4 according to the assignment-request signal WS. In this embodiment, the LAN terminal apparatus 1 assigns communication timing to the LAN terminal apparatus 2, which is a calling source, such that it transmits data first in each communication period. The LAN terminal apparatus 1 also assigns communication timing to the LAN terminal apparatus 4 such that it transmits data second in each communication period.

In the present embodiment, transmission timing is assigned as a transmission order in each communication period in this way. The transmission order specifies the timing common to all LAN terminal apparatuses with the beacon signal being used as a reference. Transmission timing in real-time communication is managed as the timing common to the LAN terminal apparatuses connected to the LAN, such as a case in which the first transmission is performed at the a predetermined time "t" after the top of the beacon signal and the second transmission is performed at a predetermined time "2t" after the top of the beacon signal.

The LAN terminal apparatus 1, which serves as the control station, generates a beacon signal which includes the information indicating the transmission timing assigned to the LAN terminal apparatus 2 and the LAN terminal apparatus 4, and transmits the beacon signal to each LAN terminal apparatus through the selected communication channel every communication period, the length of which has been determined in advance as shown in A of FIG. 6.

Each LAN terminal apparatus understands the top of each communication period and the communication timing assigned to each LAN terminal apparatus from the beacon signal transmitted from the LAN terminal apparatus 1. Each LAN terminal apparatus does not transmit a packet at timing assigned to the other LAN terminal apparatuses and transmits real-time data at the transmission timing assigned to the LAN terminal apparatus in each communication period. The transmission timing is specified in this way in a real-time zone RL shown in A, B, and C of FIG. 6.

When the LAN terminal apparatus 1 transmits the beacon signal to each LAN terminal apparatus as shown in a P2 period in A, B, and C of FIG. 6, the LAN unit 22 of the LAN terminal apparatus 2, to which the transmission order is assigned such that it transmits real-time data first in the communication period, transmits real-time data such as audio data to the LAN terminal apparatus 4 at the first timing immediately after the top of the beacon signal in the communication period.

The LAN unit 42 of the LAN terminal apparatus 4, to which the transmission order is assigned such that it transmits real-time data second in the communication period, transmits real-time data such as audio data to the LAN terminal apparatus 2 at the second timing, the next timing of that for the LAN terminal apparatus 2, in the communication period.

Both LAN terminal apparatus 2 and the LAN terminal apparatus 4 accept only the packet transmitted thereto through its LAN unit, and the interface section 203 separates the packet to transmit necessary data to its terminal apparatus 21 or 41.

With these operations, the real-time data transmitted from the LAN terminal apparatus 2 such as audio data can be reproduced by the LAN terminal apparatus 4 for listening, and the real-time data transmitted from the LAN terminal apparatus 4 such as audio data can be reproduced by the LAN terminal apparatus 2 for listening.

The LAN terminal apparatus 2 and the LAN terminal apparatus 4 alternately transfer real-time data such as audio data in real-time in each communication period repeatedly to allow a real-time call and audio-data exchange, according to the timing signal transmitted from the LAN terminal apparatus 1, serving as the control station, at the top of each communication period.

Communication terminals other than LAN terminal apparatus 2 and LAN terminal apparatus 4 can transfer real-time data within real-time zones if they receives communication timing.

Random data such as computer data is transferred by random access within random-access zones RM in which transmission timing is not assigned in each communication period, in the-same way as for the transfer of the communication-request signal RQ, the acknowledge signal AS, and the assignment-request signal WS, described before.

In the above case, bi-directional real-time communication has been taken as an example. Uni-directional real-time communication can also be performed. In this case, a LAN terminal apparatus serving as a transmission source requests the control station to assign packet-transmission timing. The LAN terminal apparatus transmits a packet at the transmission timing which is assigned by the control station in each communication period to transmit real-time data such as audio data, which requires real-time reproduction, to the desired destination.

If real-time data transmitted in a real-time zone RL could not correctly be transmitted, it is re-transmitted in a random-access zone after the real-time zone to positively transmit it.

The transmission-destination LAN terminal apparatus, for example, the LAN terminal apparatus 4 in the previous case, transmits a transmission-incomplete notice to the transmission-source LAN terminal apparatus, the LAN terminal apparatus 2 in the previous case, in the random-access zone immediately after the real-time zone where real-time data which was to be received could not be received.

The LAN unit of the LAN terminal apparatus serving as the transmission source holds a packet for transmitting the real-time data transmitted in the real-time zone immediately before, and re-transmits the packet of the real-time data transmitted in the real-time zone immediately before and currently held, when the transmission-incomplete notice is received.

Since real-time zones RL where real-time data is transmitted at assigned communication timing and random-access zones RM where random data is transmitted are provided, real-time data is positively and correctly transmitted and received without impeding a real-time feature and random data is transmitted and received in random-access zones RM.

Since carrier detection is executed to avoid collision in a communication path either when real-time data is transmitted or when random data is transmitted, even if a LAN terminal apparatus which executes random access only is connected, for example, the LAN terminal apparatus can be used in the LAN. This is because, since the period when the LAN terminal apparatus which executes random access only detects the carrier is longer than the time interval from the time when the transmission of the beacon signal is finished in a real-time zone to the time when the LAN unit 22 starts outputting a packet and the time interval from the time when the output of the packet from the LAN unit 22 is finished to the time when the LAN unit 42 starts outputting a packet, the LAN terminal apparatus which executes random access only in a real-time zone determines that data-transmission timing is not found and does not transmit a packet. This is also because, even when the LAN terminal apparatus which executes random access only transmits a packet in a real-time zone, each LAN terminal apparatus always detects the carrier before transmitting a packet and transmits it after the LAN terminal apparatus which executes random access only finishes the transmission of the packet in the real-time zone.

In the previous case, real-time zones RL are sequentially specified in a communication period by assigning transmission timing and the remaining part of the communication period, where the real-time zones RL are not specified, is set to random-access zones RM. The zone assignment is not limited to this case.

The zone assignment may be performed such that the ratio of a real-time zone RL and a random-access zone RM is specified in advance in one communication period and each zone is set in advance. For example, it may be set that two thirds of one communication period is set to a real-time zone and one third thereof is set to a random-access zone. A real-time zone and a random-access zone may be alternately specified in one communication period. A real-time zone and a random-access zone may be alternately set in units of communication periods.

As described above, in the present embodiment, the beacon signal transmitted by the LAN terminal apparatus serving as the control station through the communication channel selected by the control station is also used as a reference signal to specify a real-time zone RL and a random-access zone RM.

The structure of a radio network formed of LAN terminal apparatuses according to the present invention is not limited to the above case. A different communication method may be used. For example, a method in which only random-access zone are used or a method in which only real-time zones are used may be employed.

Communication-Channel Selection Processing

As described above, in the present embodiment, the LAN terminal apparatus serving as the control station selects a communication channel used for communication among LAN terminal apparatuses. More specifically, in the LAN in the present embodiment, a plurality of communication channels using different frequencies are prepared, and the LAN terminal apparatus serving as the control station selects a communication channel used for communication and opens a communication area.

In the LAN in the present embodiment, a carrier signal is detected before a packet is transmitted. If a communication channel having many of so-called disturbance signals is selected, however, a clear state is not promptly detected and it takes a long time to transmit a packet. As a result, the amount of data which can be transferred within a predetermined time is reduced, and quick and positive communication cannot be implemented.

In the present embodiment, the LAN terminal apparatus serving as the control station selects a communication channel having a long clear time among a plurality of communication channels using different frequencies, and opens a communication area in which communication is achieved through the selected communication channel. The reason why a communication channel having a long clear time is selected is that communication-traffic contention is unlikely to occur in such a channel.

A case in which the LAN terminal apparatus 330 subscribes to the network 3 in a space in which the network 1 formed of the LAN terminal apparatus 310, the LAN terminal apparatus 311, the LAN terminal apparatus 312, and the LAN terminal apparatus 313 and the network 2 formed of the LAN terminal apparatus 320, the LAN terminal apparatus 321, and the LAN terminal apparatus 322 are disposed, as shown in FIG. 1, will be taken as an example and will be described below.

When the LAN terminal apparatus 330 is turned on and its terminal apparatus transmits a request for connecting to a network, the LAN terminal apparatus 330 determines whether the network 3, which the LAN terminal apparatus 330 is to subscribe to, has already been established in radio channels assigned for forming radio networks and whether a beacon signal used in the network 3 has already been used in each radio channel. Since the LAN terminal apparatus 331 and the LAN terminal apparatus 332 can be connected to the network 3 but none of them is, for example, turned on, the network 3 has not yet established in the space shown in FIG. 1 and the beacon signal used in the network 3 cannot be detected.

Therefore, the LAN terminal apparatus 330 checks the electric-wave condition of the space shown in FIG. 1, in other words, achieves environment measurement, to serve as a control station, and selects a communication channel to establish a radio network.

Figure 8:
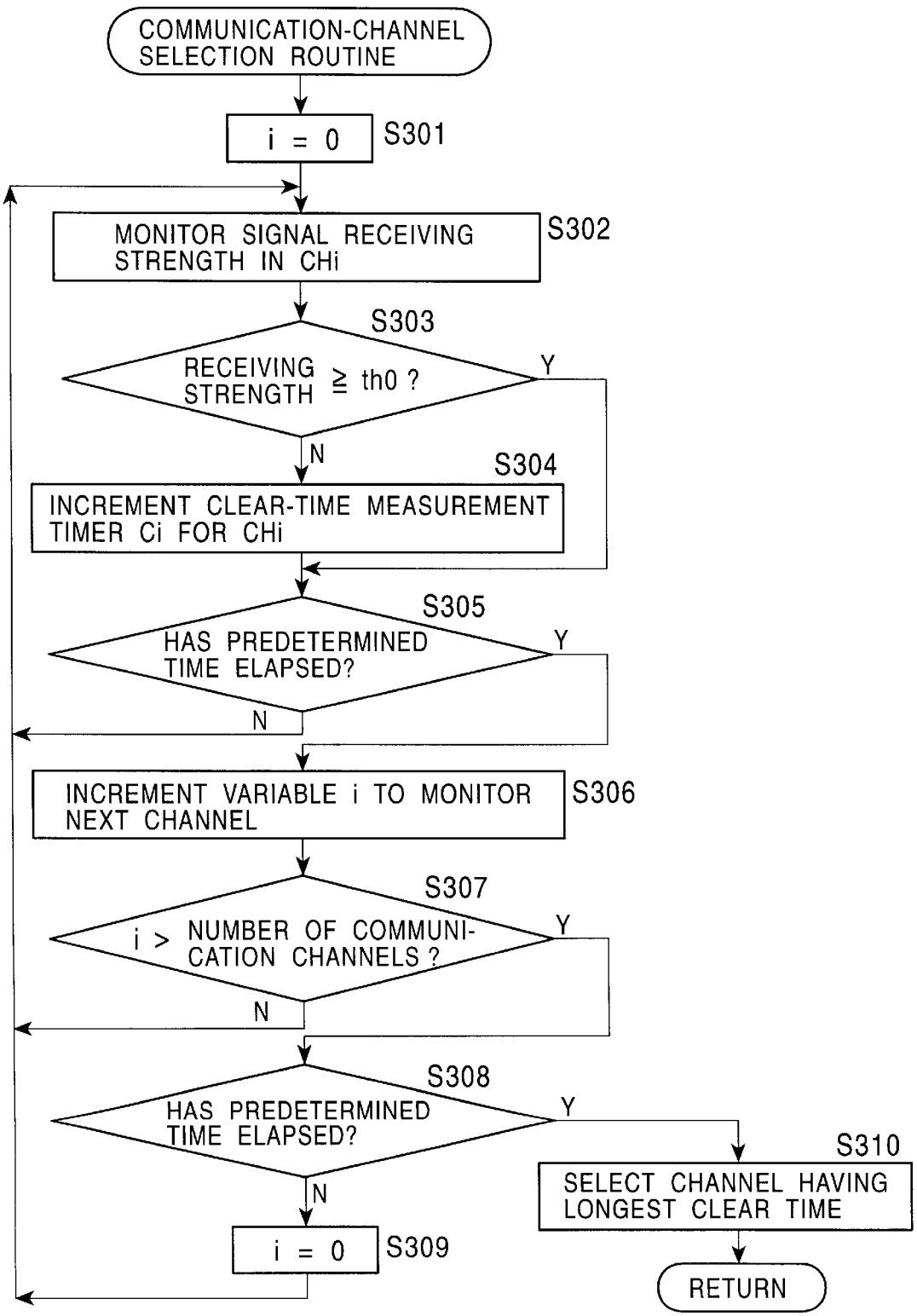
FIG. 8 is a flowchart of communication-channel selection processing executed by a LAN terminal apparatus serving as a control station.
Figure 9:
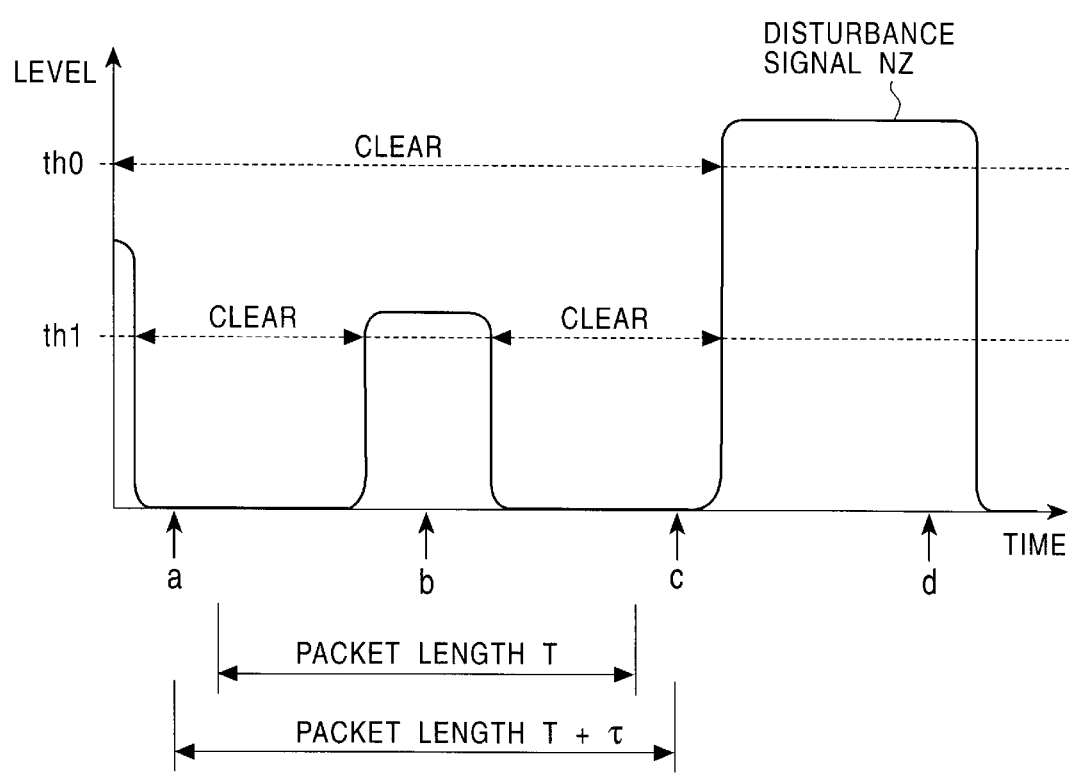
FIG. 9 is a view showing a signal state in a communication channel selected among a plurality of communication channels.

FIG. 8 is a flowchart of the communication-channel selection processing which a LAN terminal apparatus serving as a control station due to no detection of a beacon signal executes in the step S103 in the operation-state selection processing described before by referring to FIG. 5. FIG. 9 is a view of a signal state in a communication channel selected by a LAN unit in the communication-channel selection processing according to the present embodiment shown in FIG. 8.

In the LAN according to the present embodiment, a plurality of communication channels using different frequencies, such as a communication channel CH0, a communication channel CH1, and a communication channel CH2, are prepared. In the present embodiment, a LAN terminal apparatus serving as a control station switches the plurality of communication channels using different frequencies in a time-division manner, monitors them, detects a clear time of each channel, and selects a communication channel having a long clear time.

In a step S301, a variable "i" for specifying a communication channel is initialized to make a preparation for monitoring the first communication channel CH0. Since the variable "i" is initialized to zero in the step S301, CHi is set to the first communication channel CH0 and a timer Ci is set to a timer C0 corresponding to the first communication channel CH0. The variable "i" changes according to the selected channel.

The processing proceeds to a step S302 in a condition in which the communication channel for which a clear time is detected and the clear-time measurement timer for measuring the clear time of the communication channel are determined.

In the step S302, the signal receiving strength of the selected communication channel is monitored. More specifically, the transmitting and receiving section 202 of the LAN unit has a function for detecting the receiving strength of a received signal, and the control section 210 monitors the receiving strength which the transmitting and receiving section 202 detects. In a step S303, the control section 210 determines whether the receiving strength detected by the transmitting and receiving section 202 is equal to or higher than a threshold tho specified in advance. Whether the signal receiving strength in the communication channel is equal to or higher than the threshold th0 determine whether the communication channel is clear or not. When it is determined in the step S303 that the receiving strength of the received signal is lower than the threshold th0 and therefore the communication channel is clear, the control section 210 increments a count Ci in the count area for the communication channel currently monitored, the count area being provided for the timer 208 of the LAN unit, in a step S304.

As shown in FIG. 9, for example, the control section 210 of the LAN unit controls the transmitting and receiving section 202 to monitor the signal receiving strength in the communication channel at a time "a" immediately after the communication channel is selected. In the communication channel shown in FIG. 9, a disturbance signal NZ is generated. Since the receiving strength of the disturbance signal NZ is lower than the threshold th0 at the time "a," it is determined that the channel is clear and the count Ci in the count area for the communication channel is incremented.

It is determined in a step S305 whether a predetermined monitor time has elapsed for the communication channel currently monitored. When it is determined that the predetermined time has not yet elapsed, namely, when it is determined monitoring needs to continue, the processing returns to a step S302 and the communication channel CHi is monitored.

When the control section 210 determines in the step S303 that the receiving strength detected by the transmitting and receiving section 202 is equal to or higher than the threshold th0, specified in advance, it is determined that the communication channel is being used, the processing proceeds to the step S305, and it is determined whether the predetermined monitor time assigned to the selected communication channel has elapsed.

It is determined in the step S305 that the measured clear time in the selected communication channel CHi exceeds the predetermined time, the processing proceeds to a step S306 and the variable "i" is incremented in the step S306 to select the next communication channel CHi. In the next step S307, it is determined whether clear-time measurement has been finished for all of the plurality of prepared communication channels as a result of the increment. When it is determined in the step S307 that the measurement has not yet finished for a communication channel, the processing returns to the step S302 and clear-time measurement is achieved for the next communication channel.

When it is determined in the step S307 that the measurement has been finished for all the communication channels, it is determined in a step S308 whether a predetermined time for selecting a communication channel has elapsed. When it is determined in the step S308 that the predetermined time has not yet elapsed, the variable "i" used for selecting a channel is initialized in the next step S309 to repeat the measurement from the first communication channel CH0. The selected channel is initialized to CH0 in the step S309 and clear-time measurement is executed for each channel from the step S302.

When it is determined in the step S308 that the predetermined time for selecting a communication channel has elapsed, the communication channel having the largest count in the corresponding clear-time measurement timer Ci is selected in the next step S310 and the processing is terminated. As a result, the communication channel having the longest clear time among the usable communication channels is selected and a packet is transmitted with less waiting time.

When it is determined in the step S303 that the receiving strength of the received signal is equal to or higher than the threshold tho, in other words, when it is determined that the communication channel for which the clear time is currently being measured is being used, the processing may proceed to the step S306 so that the clear-time measurement for the communication channel is terminated.

Figure 7:
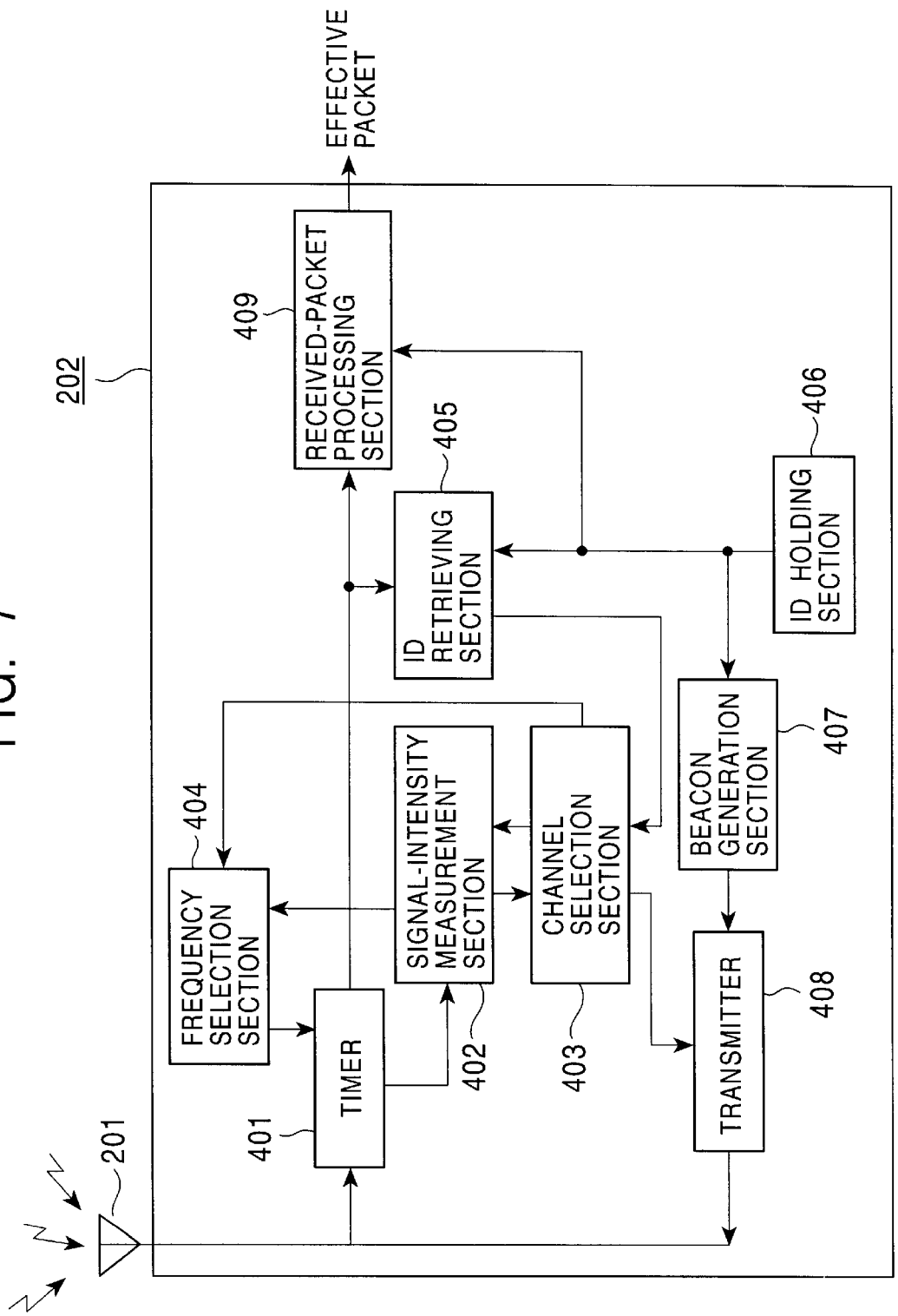
FIG. 7 is a block diagram of a transmitting and receiving section 202 shown in FIG. 4.

The present embodiment will be further described by referring FIG. 1 and FIG. 2 again. FIG. 7 shows in detail a portion related to communication-channel selection in the transmitting and receiving section 202 in a LAN terminal apparatus, shown in FIG. 4.

The LAN terminal apparatus 330, which is to establish the network 3 shown in FIG. 1, selects the channel using a predetermined frequency with the use of a tuner 401 from a radio signal received by the antenna 201 shown in FIG. 7. The channel selected by the tuner 401 is determined according to a control signal transmitted from a frequency selection section 404. The frequency selection section 404 controls the frequency of a channel according to a channel-selection control signal transmitted from a channel selection section 403.

Channels are assigned to the network 3 such that three channels for radio networks are selected.

The LAN terminal apparatus 330 first determines whether the network 3 has been established in the space shown in FIG. 1.

In the transmitting and receiving section 202, an ID holding section 406 holds an ID of 3, which indicates that the LAN terminal apparatus 330 belongs to the network 3, and transmits it to an ID retrieving section 405.

The ID retrieving section 405 determines for a predetermined time whether a beacon signal having the ID transmitted from the ID holding section 406 is detected in the signal having the frequency corresponding to that of the channel 1 tuned by the channel selection section 403, the frequency selection section 404, and the tuner 401 among electric waves received by the antenna 201. When the beacon signal having an ID of 3 is detected, the LAN terminal apparatus 330 serves as a slave station of the control station which transmits the beacon signal indicating the network 3, that is, the beacon signal having an ID of 3.

When the beacon signal having an ID of 3 cannot be detected within the predetermined time, the ID retrieving section 405 reports to the channel selection section 403 that the network 3 is not established in the channel 1, and proceeds to the same determination applied to the next channel.

When the channel selection section 403 receives the notice indicating that the network 3 is not established in the channel 1 from the ID retrieving section 405, it outputs a control signal to the frequency selection section 404 so as to select the channel 2, in order to determine whether the network 3 is established in the channel 2, which is the next channel which can be used.

The carrier is detected in the channel 1 first.

As shown in FIG. 2, the channel 1 is being used by the network 1. Since the field strength is high and the channel is continuously used, a period of time during which the field strength exceeds a predetermined value is long.

Then, the carrier is detected in the channel 2 in the same way as for the channel 1. As shown in FIG. 2, the channel 2 is being used by the network 2. The detected field strength is low and a period of time the field strength exceeds the predetermined value is short.

The carrier is detected further in the channel 3 in the same way as for the channel 1 and the channel 2. As shown in FIG. 2, no network uses the channel 3 in the space shown in FIG. 1. The LAN terminal apparatus 340 emits an electromagnetic wave for a long period of time at a frequency band close to that of the channel 3 with a high field strength without any relationship with a radio network.

When the LAN terminal apparatus 330 detects the carrier in such an electric-wave environment, the channel selection section 403 selects the channel 1. The frequency selection section 404 generates a selection control signal such that the tuner 401 tunes in to the frequency corresponding to the channel 1, and transmits it to the tuner 401. The tuner 401 tunes in to the electric wave having the frequency corresponding to the channel 1 among electric waves received by the antenna 201, and outputs the detected carrier signal to a signal-intensity measurement section 402. The signal-intensity measurement section 402 measures the signal intensity of the carrier signal obtained by the tuner 401, and determines whether the measured signal intensity is equal to or higher than a predetermined signal intensity. In addition, the signal-intensity measurement section 402 increments the count of the timer corresponding to the measured channel according to the determination result with the use of the information of the channel currently selected, transmitted from the channel selection section 403.

The carrier is detected in the channel 2 in the same way. The channel selection section 403 selects the channel 2. The frequency selection section 404 generates a selection control signal such that the tuner 401 tunes in to the frequency corresponding to the channel 2, and transmits it to the tuner 401. The tuner 401 tunes in to the electric wave having the frequency corresponding to the channel 2 among the electric waves received by the antenna 201, and outputs the detected carrier signal to the signal-intensity measurement section 402. The signal-intensity measurement section 402 measures the signal intensity of the carrier signal obtained by the tuner 401, and determines whether the measured signal intensity is equal to or higher than the predetermined signal intensity. In addition, the signal-intensity measurement section 402 increments the count of the timer corresponding to the measured channel according to the determination result with the use of the information of the channel currently selected, transmitted from the channel selection section 403.

As a result of the carrier detection in each channel, the signal-intensity measurement section 402 holds the results of the signal-intensity measurements achieved for the three channels as the counts of the corresponding timers.

The channel selection section 403 achieves carrier detection in each of communication channels which can be used for a radio network, obtains the result of the signal-intensity measurement achieved for each communication channel from the signal-intensity measurement section 402, and then determines whether a communication channel which satisfies a predetermined condition can be used for the network to be structured. When each channel has the field strength shown in FIG. 2 in the environment shown in FIG. 1, the channel 2 has the lowest count. This is because the detected signal intensity is low and the period of time when an electric wave is emitted is the shortest in the measurement period. The channel selection section 403 determines that it does not select the channel 3, which is not used by any network, but it selects the channel 2, which has the highest possibility of providing the longest communication time, as the communication channel to be used by the network 3.

Since the channel 2 is selected for the network 3, the channel selection section 403 controls the frequency selection section 404 so as to receive packets in the selected channel 2, the frequency selection section 404 controls the tuner 401 so as to tune in to the frequency corresponding to the channel 2, and the tuner 401 outputs the signal received in the channel 2 to a received-packet processing section 409. The received-packet processing section 409 obtains the ID of the packet to be extracted, from the ID holding section 406, extracts only the packet having the ID obtained from the ID holding section 406 in the received signal output from the tuner 401, and outputs the packet to the subsequent circuit as an effective packet.

Since the LAN terminal apparatus 330 serves as the control station in the network 3, it needs to transmit a beacon signal indicating that the network 3 has already been structured in the space shown in FIG. 1 at an interval of a predetermined time. In the LAN terminal apparatus 330, a beacon generation section 407 generates at an interval of the predetermined time a beacon signal which includes the ID indicating the network 3, obtained from the ID holding section 406, and a transmitter 408 modulates the signal in frequency in the channel 2 in this case according to the information of the selected channel, obtained from the channel selection section 403 and emits as an electromagnetic wave from the antenna 201.

With the above procedure, the LAN terminal apparatus serving as the control section achieves the electromagnetic-wave environment measurement, selects the channel having the least effect on packet communication from electromagnetic waves emitted from other apparatuses, and structures and opens the radio network.

The ID holding section 406 may be configured such that it holds not only the network ID but also, for example, the own ID or the ID unique to the apparatus so that the received-packet processing section 409 outputs only the packet transmitted to the apparatus. The beacon generation section 407 may be configured such that it transmits a beacon signal which also includes the ID of the LAN terminal apparatus which generates the beacon signal.

The detection of the signal intensity of the carrier signal and that of the beacon signal indicating the network which the apparatus concerned belongs to are sequentially executed in the foregoing description. The way of achieving the detections is not limited to this case. The detections may be achieved in parallel, so that the apparatus is connected to the network in a shorter time.

Another Embodiment (Another Communication-Channel Selection Method)

Figure 10:
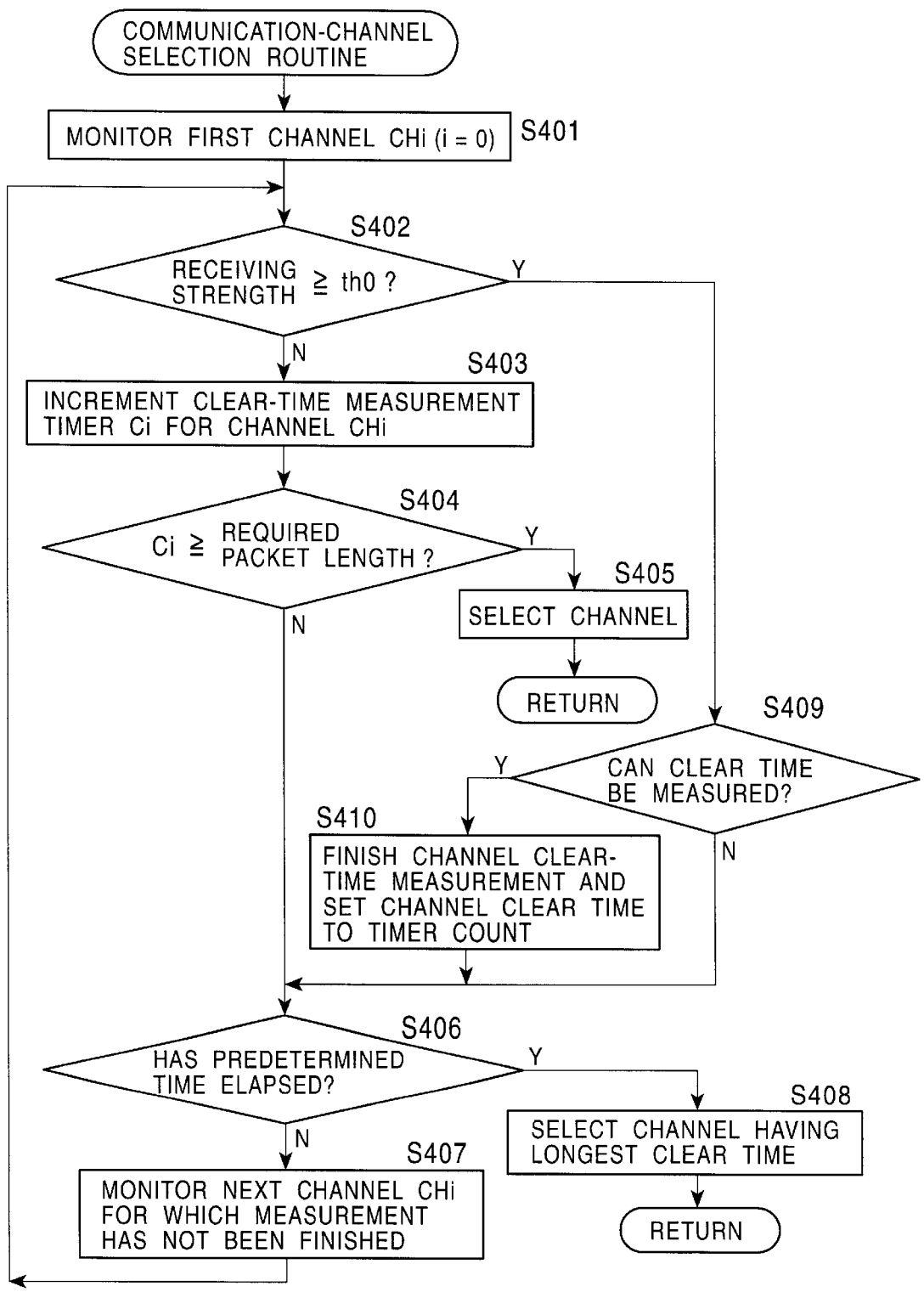
FIG. 10 is a flowchart of another communication-channel selection processing executed by the LAN terminal apparatus serving as the control station.

Another embodiment will be described below by referring to FIG. 10. In FIG. 10, in the LAN unit of a LAN terminal apparatus serving as a control station, the control section 210 controls the PLL circuit of the transmitting and receiving section 202 so as to select a first communication channel CH0 among a plurality of selectable communication channels and to monitor it in a step S401.

In the step S401 in FIG. 10, the variable "i" of the channel CHi is zero, and the first communication channel CH0 is selected. In this specifications, the variable "i" changes according to the selected channel.

In the step S401, the receiving strength of a signal in the selected communication channel is monitored. In other words, the transmitting and receiving section 202 of the LAN unit has a function for detecting the receiving strength of a received signal. A control section 210 monitors the receiving strength detected by the transmitting and receiving section 202. The control section 210 determines in a step S402 whether the detected receiving strength is equal to or higher than a threshold th0 specified in advance.

Whether the signal receiving strength in the communication channel is equal to or higher than the threshold th0 determines whether the communication channel is clear or not. When it is determined in the step S402 that the receiving strength of the received signal is lower than the threshold th0 and therefore the communication channel is clear, the control section 210 increments a count Ci in the count area for the communication channel currently monitored, the count area being provided for the timer 208 of the LAN unit, in a step S403.

As shown in FIG. 9, for example, the control section 210 of the LAN unit controls the transmitting and receiving section 202 so as to monitor the signal receiving strength in the communication channel at a time "a" immediately after the communication channel is selected. In the communication channel shown in FIG. 9, a disturbance signal NZ is generated. Since the receiving strength of the disturbance signal NZ is lower than the threshold th0 at the time "a," it is determined that the channel is clear and the count Ci in the count area for the communication channel is incremented.

In the present embodiment, the control section 210 of the LAN unit determines in a step S404 whether the clear-time length indicated by the count Ci of the counter for measuring the clear time in the communication channel currently monitored is equal to or longer than the time length corresponding to the packet length of a transmission packet.

A condition in which the clear time in the communication channel is longer than the time length corresponding to the packet length of the transmission packet is used in this way to detect a clear time longer than the time length T corresponding to the transmission-packet length. The transmission-packet length is set to a reference because a communication channel in which the whole of one transmission packet is positively transmitted is selected. In a communication channel having a clear time longer than the time length corresponding to the transmission-packet length, a relatively long waiting time caused because the communication channel is not clear when a packet is transmitted does not occur.

When a period of time when the signal receiving strength of a communication channel is monitored is set, for example, to the time length T corresponding to the transmission-packet length or to a period T+$\tau$ slightly longer than the length T, if the count Ci of the timer 208 for the communication channel is equal to or more than (T+$\tau$)/(time interval for monitoring signal receiving strength), it is determined in the step S404 that the clear time is equal to or longer than the time length corresponding to the transmission-packet length. Any time period is indicated by $\tau$.

More specifically, in the communication channel shown in FIG. 9, when the time length T+$\tau$, which is slightly longer than the time length T corresponding to the packet length, is set to the total of the interval between the time "a" where a signal receiving strength is monitored and a time "b" when the signal receiving strength is monitored next and the interval between the time "b" and a time "c" when the signal receiving strength is monitored next, if the count Ci of the timer 208 for the communication channel to be monitored reaches 3, it is determined in the step S404 that the clear time is equal to or more than the time length of the transmission-packet length.

In other words, when the reference value of the count Ci of the timer 208 for the communication channel is definitely specified correspondingly to a condition in which the clear time is equal to or longer than the time length corresponding to the transmission-packet length, and the reference value is written, for example, into the ROM 206, whether the clear time is equal to or longer than the time length corresponding to the transmission-packet length can be determined by comparing the count Ci of the timer 208 for the communication channel with the reference value held by the ROM 206. Therefore, when the interval of monitoring the signal receiving strength for the communication channel is set to one Nth the time length corresponding to the transmission-packet length or less, whether the clear time is equal to or longer than the time length corresponding to the transmission-packet length can be precisely determined according to the count Ci of the timer 208 for the communication channel and the reference value.

To make the figure simple, the count Ci of the timer 208 is set to 3 in FIG. 9. In an actual case, since the time length T corresponding to the packet length is set, for example, to about 10 ms whereas the monitoring interval of receiving strength is set, for example, to about 20 $\mu$s, the clear time of the communication channel is precisely measured.

When it is determined in the step S404 that the clear time indicated by the count Ci is longer than the time length T corresponding to the transmission-packet length, the control section 210 of the LAN unit selects the communication channel currently being monitored as a communication channel for communication, in a step S405, and the communication-channel selection processing shown in FIG. 10 is terminated. Then, the process in the step S104 in the operation-state selection processing shown in FIG. 5 is executed. The LAN terminal apparatus serving as the control station generates a beacon signal and transmits it through the selected communication channel to each LAN terminal apparatus.

When it is determined in the step S402 that the receiving strength of the received signal is higher than the threshold th0 and a disturbance signal occurs, it is determined in a step S409 whether the clear time can be measured with the use of the timer 208. In other words, the determination process in the step S409 determines whether the count in the count area corresponding to the communication channel currently being monitored is 1 or more and the channel state is changed from a clear state, namely, a not-used state, to a state in which a disturbance signal occurs, namely, a used state.

When it is determined in the step S409 that a clear time can be measured, the control section 210 of the LAN unit terminates the measurement of the clear time for the communication channel, and holds the count in the count area corresponding to the communication channel in the timer 208 as the clear time, in a step S410.

When it is determined in the step S404 that the clear time indicated by the count Ci is shorter than the time length corresponding to the transmission-packet length, when it is determined in the step S409 that a clear time cannot be measured, or when the process of the step S410 is finished, it is determined in a step S406 whether a predetermined time specified as a communication-channel monitoring time has elapsed.

When it is determined in the step S406 that the predetermined time has not yet elapsed, the control section 210 of the LAN unit monitors the next communication channel CHi, for which a clear time has not been measured, in a step S407, the processing returns to the step S402, and the subsequent processes are repeated.

As described above, the control section 210 of the LAN unit serving as the control station sequentially switches the receiving frequency and monitors the receiving strength of received signals for other communication channels. When the plurality of communication channels using different frequencies are monitored once, second monitoring starts for the communication channel monitored first.

When it is determined in the step S406 that the predetermined time specified in advance has elapsed, the control section 210 of the LAN unit uses the count in the count area corresponding to each communication channel in the timer 208 to select the communication channel having the longest clear time in a step S408, and the communication-channel selection processing shown in FIG. 10 is terminated. Then, the process of the step S104 in the operation-state selection processing shown in FIG. 5 is executed.

Signal receiving strength is monitored for each channel, the frequency is sequentially changed, and a plurality of selectable communication channels are monitored for a predetermined time. The predetermined time is set, for example, to a multiple of the time length T corresponding to the packet length or to a multiple of a period slightly longer than the time length T corresponding to the packet length, that is, a multiple of the time length T+τ, so that a communication channel having a clear time longer than the time length corresponding to the packet length can be detected. Any time length is indicated by τ.

When the receiving strength of a signal is monitored for a predetermined time for each of a plurality of communication channels, including the communication channel shown in FIG. 9, since the receiving strength of a signal is lower than the threshold th0 for the communication channel shown in FIG. 9 at each of the first monitoring point "a," the second monitoring point "b," and the third monitoring point "c," it is determined that the communication channel is clear and the count in the count area corresponding to the communication channel of the timer 208 provided for the LAN unit is incremented in the process of the step S403, as described before.

At the fourth monitoring point "d," the receiving strength in the communication channel is equal to or higher than the threshold th0 due to the disturbance signal for the first time, and the measurement of a clear time is terminated. The count Ci corresponding to the clear time in the communication channel is 3. When the count Ci itself is used as the clear time and the communication channel having the largest count Ci is selected, the communication channel having the longest clear time is selected.

As described above, the LAN terminal apparatus serving as the control station and transmitting a beacon signal selects a communication channel having a long clear time, which means communication-traffic-contention is unlikely to occur, among a plurality of selectable communication channels using different frequencies, and opens a communication area to achieve communication in the communication channel.

In the case shown in FIG. 9, the clear time detected first for each communication channel is used as the clear time of the communication channel. The method for obtaining a clear time is not limited to this case.

For example, the following method may be used. When it is determined in the step S409 that a clear time can be measured, the count in the count area corresponding to the communication channel in the timer 208 is used as a clear time, and stored, for example, in the RAM 207 in the step S410. The count is held in the RAM 207 as a clear time, and the count in the count area is reset. In the predetermined time, the measurement of a clear time continues for a communication channel for which a clear time has been measured. In other words, in the predetermined time, the measurement of a clear time continues for each communication channel, and even if a clear time is stopped due to a disturbance signal, a plurality of clear times are measured for each communication channel. When it is determined in the step S406 that the predetermined time, specified as the time of monitoring a plurality of communication channels, has elapsed, the plurality of counts held in the RAM 207 for each communication channel are used and the communication channel having the longest clear time indicated by a count is selected in the step S408.

In this case, since the total clear time of each communication channel in the predetermined time can be obtained, a communication channel in which communication-traffic-contention is unlikely to occur due to a long clear time indicated by a count and a long total clear time can be selected as a communication channel to be used.

In the embodiment described before, to select a communication channel for communication among a plurality of communication channels using different frequencies, the plurality of communication channels using different frequencies are switched in a time-division manner and monitored. The method for monitoring a plurality of communication channels using different frequencies is not limited to this case.

Each communication channel may be monitored for a predetermined time to detect a clear time for the channel. For example, the communication channel CH0 is monitored for a predetermined time specified in advance to detect a clear time for the communication channel CH0, and then the communication channel CH1 is monitored for the predetermined time to detect a clear time for the communication channel CH1.

Either when a plurality of communication channels using different frequencies are switched in a time-division manner and monitored or when each communication channel is monitored for a predetermined time, if the interval of monitoring timing is reduced, a clear time is detected more precisely.

In the LAN according to the present embodiment, the control section 210, the transmitting and receiving section 202, the interface section 203, and the timer 208 cooperate as required to implement the functions for determining whether a control station has operated, for detecting a clear time, for selecting a communication channel, and for transmitting a control signal. When a LAN terminal apparatus according to the present embodiment operates as a control station, it selects a communication channel in which traffic contention is unlikely to occur and opens a communication area in which successful communication is achieved.

Still Another Embodiment (Still Another Communication-Channel Selection Method)

In the above embodiment, the threshold th0 is used as the threshold of the receiving strength of a signal, for measuring the clear time of each communication channel, as described before by referring to FIG. 9. When the threshold of the receiving strength is set lower, if a communication channel having a clear time longer than the time length corresponding the transmission-packet length is found, more successful and positive communication is achieved without reducing the communication quality by the use of the communication channel.

A clear time is detected for a communication channel a plurality of times with the threshold of receiving strength being switched. For example, as shown in FIG. 9, a clear time is detected with the threshold th0 being used as the threshold of receiving strength, and then a clear time is detected with a threshold th1 lower in level than the threshold th0 being used.

In the case shown in FIG. 9, a clear time is longer when the threshold th0 is used as the threshold of receiving strength than when the threshold th1 is used as the threshold of receiving strength. When the threshold of receiving strength is reduced from the threshold th0 to the threshold th1, however, if a communication channel having a sufficient clear time is found, it may be advantageous in some cases to use the communication channel having a low-level disturbance signal.

According to the results of clear-time detections executed a plurality of times for each communication channel with the threshold of receiving strength being changed, in other words, according to both receiving strength and a clear time in each detection, a communication channel which provides more successful communication may be selected. The number of used thresholds and the level differences between thresholds are adjusted according to a communication network to be structured, such as a LAN, to allow a communication channel suited to the communication network to be structured to be selected.

In the embodiments described before, when the power is applied to the LAN unit of each LAN terminal apparatus, it is determined by detecting a beacon signal whether the LAN terminal apparatus operates as a control station or a slave station. When it operates as the control station, it executes the communication-channel selection processing.

With a change in electric-wave condition being taken into account, communication-channel selection may be executed at an interval of an appropriate period or between processes to change the communication area. For example, the control station can select a communication channel at a predetermined interval, such as every hour or every two hours, or when a waiting time longer than a predetermined time specified in advance occurs during packet transmission.

To change the opened communication area to that using another communication channel, the communication channel to be used after the change is reported to LAN terminal apparatuses serving as slave stations by a beacon signal to allow the communication channel to be re-selected smoothly.

In the embodiments described before, the peer-to-peer LAN is described. The network structure is not limited to this type. The present invention can be applied to communication networks having various structures. For example, the present invention can be applied to a network having a special server apparatus operating as a control station. Therefore, the present invention can also be applied to a case in which a communication apparatus which operates as a control station in a fixed manner, such as a special server apparatus operating as a control station, selects a communication channel.

In the embodiments described before, both real-time access and random access are used among LAN terminal apparatuses. The communication type is not limited to this case. The present invention can also be applied to a network in which only real-time communication is used, or to a network in which only random communication is used.

In the embodiments described before, a LAN unit serving as a communication terminal of the present invention is separated from a terminal apparatus. The apparatus structure is not limited to this case. A LAN unit may be mounted on a terminal apparatus.

In other words, a terminal apparatus may be configured such that it has a communication function and the control section of the terminal apparatus has the same function as the control section of a LAN unit. In this case, the function of the control section of the LAN unit may be implemented by software operating in the control section of the terminal apparatus.

In the above embodiments, carrier detection is not necessarily executed for all communication channels when a communication channel is selected. For example, the user specifies a plurality of usable communication channels and carrier detection may be executed only for the specified channels. This method provides advantages that a monitoring time for selecting communication channels between networks disposed close to each other can be reduced by limiting communication channels used for a plurality of networks to some extent by the user.

As described above, according to the present invention, since a communication channel having a long clear time is selected to open a communication area among a plurality of communication channels using different frequencies, and the selected communication channel is unlikely to generate communication-traffic contention. Because the communication channel, in which communication-traffic contention is unlikely to occur, is used for communication, the transfer capacity of data is substantially increased.

What is claimed is:

1. A radio-communication-channel selection method used in a radio communication system in which a plurality of radio networks share a plurality of radio communication channels, for selecting a predetermined radio communication channel among the plurality of radio communication channels and for setting the predetermined radio communication channel as a radio communication channel of a new radio network, said selection method comprising:

a determination step of determining whether an ID of the new radio network is received;

a measurement step of detecting radio-signal intensity for a predetermined time for each of the plurality of radio communication channels and measuring a time when each radio communication channel is clear according to the detected radio-signal intensity and a predetermined value for each of the plurality of radio communication channels when it is determined in said determination step that the ID of the new radio network is not received; and a radio communication-channel selection step of selecting the predetermined radio communication channel to be used for the new radio network, according to the time when each radio communication channel is clear measured for each of the plurality of radio communication channels.

2. The radio-communication-channel selection method according to claim 1, wherein the selected predetermined communication channel has a longest clear time among the plurality of radio communication channels.

3. The radio-communication-channel selection method according to claim 1, further comprising:

a calculation step of calculating a time required for communication of a communication packet to be transmitted, prior to said radio-communication-channel selection step, wherein the selected predetermined radio communication channel has a clear time at least longer than the time required for the communication of the communication packet.

4. The radio-communication-channel selection method according to claim 1, wherein at least two predetermined values are used for comparison with the radio-signal intensity to measure the time when each radio communication channel is clear, in said measurement step.

5. The radio-communication-channel selection method according to claim 1, wherein the time when each radio communication channel is clear is measured a plurality of times for each of the plurality of radio communication channels in the measurement step.

6. The radio-communication-channel selection method according to claim 1, wherein the time when each radio communication channel is clear is measured at a predetermined interval of time even after the predetermined radio communication channel is selected, to select again a radio communication channel to be used for the new radio network.

7. The radio-communication-channel selection method according to claim 1, wherein the time when each radio communication channel is clear is measured for each of a plurality of radio communication channels selected in advance, and the radio communication channel to be used for the new radio network is selected among the plurality of radio communication channels selected in advance.

8. The radio-communication-channel selection method according to claim 1, wherein each of the plurality of radio networks has an ID and wherein an apparatus subscribes to a radio network when an ID of the communication apparatus matches the ID of the radio network, detected in each of the plurality of radio communication channels.

9. The radio-communication-channel selection method according to claim 8, wherein an apparatus which has selected the predetermined radio communication channel transmits a beacon signal at a predetermined-time interval together with the ID of the new radio network, detected in each of the plurality of radio communication channels.

10. A method for joining a predetermined network in a radio communication area where a plurality of adjacent radio networks which share a plurality of radio communication channels are structured, said method comprising:

a detection step of detecting a radio network having a predetermined ID in the plurality of radio communication channels;

when a radio network having the predetermined ID is detected in said detection step, a step of executing communication according to a beacon signal transmitted at a predetermined-time interval by a control station which controls the radio network having the predetermined ID;

a step of detecting radio-signal intensity for a predetermined time for each of the plurality of radio communication channels and of measuring a time when the detected radio-signal intensity is at most a predetermined radio-signal intensity for each of the plurality of radio communication channels;

a step of selecting a radio communication channel used for a new radio network according to the time when the detected radio-signal intensity is at most the predetermined radio-signal intensity, measured for each of the plurality of radio communication channels; and a step of outputting a beacon signal indicating a start of a communication period and including the predetermined ID to the selected radio communication channel at a predetermined-time interval.

* * * * *